United States Patent
Hatakeyama et al.

(10) Patent No.: US 6,195,401 B1
(45) Date of Patent: Feb. 27, 2001

(54) DATA RECEIVING APPARATUS AND METHOD

(75) Inventors: Izumi Hatakeyama, Tokyo; Tetsuya Naruse, Chiba, both of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/064,507

(22) Filed: Apr. 23, 1998

(30) Foreign Application Priority Data

Apr. 28, 1997 (JP) ................................. 9-111479

(51) Int. Cl.[7] .................................... H04L 27/06
(52) U.S. Cl. ................................. 375/341
(58) Field of Search ................... 375/341, 340, 375/316, 262; 371/43.1, 43.7

(56) References Cited

U.S. PATENT DOCUMENTS

| | | |
|---|---|---|
| 5,396,518 * | 3/1995 | How ..................... 375/265 |
| 5,949,814 * | 9/1999 | Odenwalder et al. ........... 370/260 |
| 6,018,545 * | 1/2000 | Fukumasa et al. ............ 375/347 |

OTHER PUBLICATIONS

Joachim Hagenauer, "Rate Compatible Punctured Convolutional Codes (RCPC Codes) and their Applications", IEEE Transaction Communications, vol. 36, No. 4, Apr. 1988, pp. 389–400*

Arnold m. Michelson et al., "The preformance of a Severly Punctured Convolutional Code, Some High Rate Distance–Two Block Codes, and a Hamming Code with Maximum Likelihood Decoding", IEEE Trasaction on Communicationbns, vol. 42, No. 2/3/4, Feb./Mar./Apr.*

* cited by examiner

Primary Examiner—Tesfaldet Bocure
(74) Attorney, Agent, or Firm—Jay H. Maioli

(57) ABSTRACT

A receiving apparatus and a receiving method translates information of reception data, received by receiving means into a soft decision symbol with data translating means, translates a replacement information into the specific soft decision symbol which indicates that information has disappeared due to replacement to create first disappeared-information added data, decodes this through de-interleaving means and decoding means, and locates disappeared information a the replaced position without a translation table of the replaced position and/or an arithmetic circuit. In this way, disappearance treatment of the received data can be performed with a simple circuit configuration, and the resulting first disappearance-information added data can be decoded using known techniques.

8 Claims, 10 Drawing Sheets

| Transmission Processing | Data Replacement Factor | Number of Symbols after Interleaving | Number of Symbols after Convolutional Coding | Convolutional Coding Factor | Quantity of Data/20msec | Information | CRC | Tail bit |
|---|---|---|---|---|---|---|---|---|
| 9600bps | 1/32 symbol | 384 symbol | 384 symbol | 1/2 | 192bit | 172bit | 12bit | 8bit |
| 4800bps | | | 192 symbol | | 96bit | 80bit | 8bit | 8bit |

FIG. 4

| bit3 | bit2 | bit1 | bit0 | Polarity | Reliability | Metric(Hex) | |
|---|---|---|---|---|---|---|---|
| | | | | | | BM0 | BM1 |
| 0 | 1 | 1 | 1 | 0 | High | 0 | F |
| 0 | 1 | 1 | 0 | 0 | \| | 1 | E |
| 0 | 1 | 0 | 1 | 0 | \| | 2 | D |
| 0 | 1 | 0 | 0 | 0 | \| | 3 | C |
| 0 | 0 | 1 | 1 | 0 | \| | 4 | B |
| 0 | 0 | 1 | 0 | 0 | \| | 5 | A |
| 0 | 0 | 0 | 1 | 0 | \| | 6 | 9 |
| 0 | 0 | 0 | 0 | 0 | Low | 7 | 8 |
| 1 | 1 | 1 | 1 | 1 | Low | 8 | 7 |
| 1 | 1 | 1 | 0 | 1 | \| | 9 | 6 |
| 1 | 1 | 0 | 1 | 1 | \| | A | 5 |
| 1 | 1 | 0 | 0 | 1 | \| | B | 4 |
| 1 | 0 | 1 | 1 | 1 | \| | C | 3 |
| 1 | 0 | 1 | 0 | 1 | \| | D | 2 |
| 1 | 0 | 0 | 1 | 1 | \| | E | 1 |
| 1 | 0 | 0 | 0 | 1 | High | F | 0 |

FIG. 6

| bit3 | bit2 | bit1 | bit0 | Polarity | Reliability | Metric(Hex) | |
|---|---|---|---|---|---|---|---|
| | | | | | | BM0 | BM1 |
| 0 | 1 | 1 | 1 | 0 | High | 0 | D |
| 0 | 1 | 1 | 0 | 0 | \| | 1 | C |
| 0 | 1 | 0 | 1 | 0 | \| | 2 | B |
| 0 | 1 | 0 | 0 | 0 | \| | 3 | A |
| 0 | 0 | 1 | 1 | 0 | \| | 4 | 9 |
| 0 | 0 | 1 | 0 | 0 | \| | 5 | 8 |
| 0 | 0 | 0 | 1 | 0 | Low | 6 | 7 |
| 0 | 0 | 0 | 0 | Disappearance | | 0 | 0 |
| 1 | 1 | 1 | 1 | 1 | Low | 7 | 6 |
| 1 | 1 | 1 | 0 | 1 | \| | 8 | 5 |
| 1 | 1 | 0 | 1 | 1 | \| | 9 | 4 |
| 1 | 1 | 0 | 0 | 1 | \| | A | 3 |
| 1 | 0 | 1 | 1 | 1 | \| | B | 2 |
| 1 | 0 | 1 | 0 | 1 | \| | C | 1 |
| 1 | 0 | 0 | 1 | 1 | High | D | 0 |
| 1 | 0 | 0 | 0 | Free | | | |

FIG. 7

| Loss | bit3 | bit2 | bit1 | bit0 | Polarity | Reliability | Metric(Hex) BM0 | BM1 |
|---|---|---|---|---|---|---|---|---|
| 0 | 0 | 1 | 1 | 1 | Free | | | |
| 0 | 0 | 1 | 1 | 0 | 0 | High | 0 | D |
| 0 | 0 | 1 | 0 | 1 | 0 | | 1 | C |
| 0 | 0 | 1 | 0 | 0 | 0 | | 2 | B |
| 0 | 0 | 0 | 1 | 1 | 0 | | 3 | A |
| 0 | 0 | 0 | 1 | 0 | 0 | | 4 | 9 |
| 0 | 0 | 0 | 0 | 1 | 0 | | 5 | 8 |
| 0 | 0 | 0 | 0 | 0 | 0 | Low | 6 | 7 |
| 0 | 1 | 1 | 1 | 1 | 1 | Low | 7 | 6 |
| 0 | 1 | 1 | 1 | 0 | 1 | | 8 | 5 |
| 0 | 1 | 1 | 0 | 1 | 1 | | 9 | 4 |
| 0 | 1 | 1 | 0 | 0 | 1 | | A | 3 |
| 0 | 1 | 0 | 1 | 1 | 1 | | B | 2 |
| 0 | 1 | 0 | 1 | 0 | 1 | | C | 1 |
| 0 | 1 | 0 | 0 | 1 | 1 | High | D | 0 |
| 0 | 1 | 0 | 0 | 0 | Free | | | |
| 1 | * | * | * | * | Disappearance | | 0 | 0 |

FIG. 9

DATA RECEIVING APPARATUS AND METHOD

BACKGROUND OF THE INVENTION

1. FIELD OF THE INVENTION

This invention relates to a data receiving apparatus and a data receiving method, and more particularly, is applicable to a communication terminal of a digital portable telephone system and a method of receiving a data in the communication terminal.

2. DESCRIPTION OF THE RELATED ART

In recent years, the Code Division Multiple Access (CDMA) mode is known as a scheme of wireless connection between the base station and a communication terminal of a digital portable telephone system.

The CDMA mode has been standardized (Standard IS-95) by Telecommunications Industry Association (TIA), and prescribed that one species of transmission rate should be used in the radio section between a base station and a communication terminal (hereinafter, this is referred to as the radio transmission rate) and, as to transmission processing of the data at the inside of the communication terminal, a transmission processing rate which is suited for the quality of the circuit and the quality of the data, etc. should be selected and used out of the plural species of transmission rates (hereinafter, these are referred to as the trans mission processing rates) which are 1/n of the radio transmission rate ("n" are arbitrary integers).

Besides, the CDMA mode has bee n prescribed that, when the data is transmitted from the communication terminal, the data which is comprised of the consecutive plural symbols can be transmitted such that the symbols are regularly thinned out on the basis of the punctured Viterbi decoding mode, so that the data quantity which is transmitted can be decreased and the transmission efficiency can be improved.

Moreover, the CDMA mode has been prescribed that, when the data is transmitted from the communication terminal, the symbol of the stated position of the data which is comprised of the consecutive symbols can be replaced by, for instance, the control information of the transmission power (that is, power control bits) which has the same number as this and then transmitted. Thus, the receiving side is caused to control the transmission power on the basis of the control information and transmission of the radio section is optimized.

In the case where the symbol of the stated position of the data is replaced by the control information and then transmitted, the communication terminal performs convolutional coding with respect to the data which is the object of transmission, interleaves the resultant coded data, replaces the symbols of the different random positions selected for every stated number of symbols by the control information, and then transmits it.

A communication terminal which has received such a data has previously stored the information of the position where replacement by the control information has been performed (hereinafter, this is referred to as the replaced position information), and demodulates the received data into the soft decision symbols, and then takes out the control information from the demodulated data which has been thus obtained on the basis of the replaced position information. However, if the remaining data after the control information is taken out from the demodulated data is less than the original data, it is difficult to obtain the correct result of Viterbi decoding by using the remained data.

Therefore in this case, in the communication terminal, disappearance information which represents that the original symbols have disappeared owing to the control information is once stored in the storage circuit, along with the demodulated data whose control information has been taken out. In this state, de-interleaving is performed by reading out the respective symbols of the demodulated data, which has been stored in the storage circuit, in an order different from the order of storing, and by inserting the disappearance information in the positions at which the control information has been taken out (hereinafter, these are referred to as the disappeared symbol positions) at the time of said reading out, and then Viterbi decoding is performed on thus obtained data whose data quantity is equivalent to that of the original data.

By the way, in such a communication terminal, a translation table or an arithmetic circuit is required for reading out the demodulated data and the disappearance information which have been stored in the storage circuit, for inserting the disappearance information in the disappeared symbol positions while de-interleaving, and for translating the replaced position information into the new replaced positions which have been de-interleaved, so there has been such a problem that the scale of the circuit for executing disappearance treatment is large.

Besides, in the communication terminal, in the case of receiving data where the number of bits of each symbol of the received data is relatively large, a comparatively large capacity of storage circuit is required in response to the number of bits of the symbol, since the demodulated data and the disappearance information are stored in the storage circuit at the time of de-interleaving. There has been such a problem that the scale of the circuit for executing disappearance treatment is further enlarged in such a case.

SUMMARY OF THE INVENTION

In view of the foregoing, an object of this invention is to provide a data receiving apparatus and method which is capable of performing disappearance treatment of the data whose information of the stated positions has been replaced into the stated replacement information, with a simple circuit configuration, and then decoding the resulted first disappeared-information added data as in the past.

The foregoing object and other objects of the invention have been achieved by the provision of a data receiving apparatus for successively generating coded data including predetermined number of symbols from digital data, for interleaving the coded data, for respectively replacing a plurality of predetermined symbols in the coded data which has been interleaved by a plurality of symbols representing the stated information to generate data, and for receiving the transmission data which is transmitted. The apparatus comprises: receiving means for receiving the transmission data and generating the first soft decision data from the received data; data translating means for replacing the symbols representing the stated information of the first soft decision data by the specific symbol, and for generating the second soft decision data that the value used to represent the information of each symbol is less than that of the first soft decision data; de-interleaving means for de-interleaving the second soft decision data from the data translating means and generating the third soft decision data; and Viterbi decoding means for decoding the third soft decision data from the de-interleaving means.

Further, according to this invention, the data receiving method for successively generating coded data including predetermined number of symbols from digital data, for interleaving the coded data, for respectively replacing a plurality of predetermined symbols in the coded data which has been interleaved by a plurality of symbols representing the stated information to generate data, and for receiving the transmission data which is transmitted, the method comprises the steps of: receiving the transmission data and generating the first soft decision data from the received data; replacing the symbols representing the stated information of the first soft decision data by the specific symbol, and generating the second soft decision data that the value used to represent the information of each symbol is less than that of the first soft decision data; de-interleaving the second soft decision data and generating the third soft decision data; and Viterbi decoding the third soft decision data.

According to the data receiving apparatus and method, it is able to position the disappearance information on the replaced position as in the past, without a translation table of the replaced positions which has been needed formerly, and without an arithmetic circuit for translating the replaced positions.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a diagram explaining the data format in the channel codec;

FIG. 6 is a diagram explaining the demodulated data which is comprised of 16-valued soft decision data;

FIG. 7 is a diagram explaining the first disappearance-information added data which is comprised of the 14-valued soft decision data and the disappearance information;

FIG. 9 is a diagram explaining the third disappearance-information added data which is comprised of the 14-valued soft decision data and the disappearance information;

DETAILED DESCRIPTION OF THE EMBODIMENT

Figure 1:
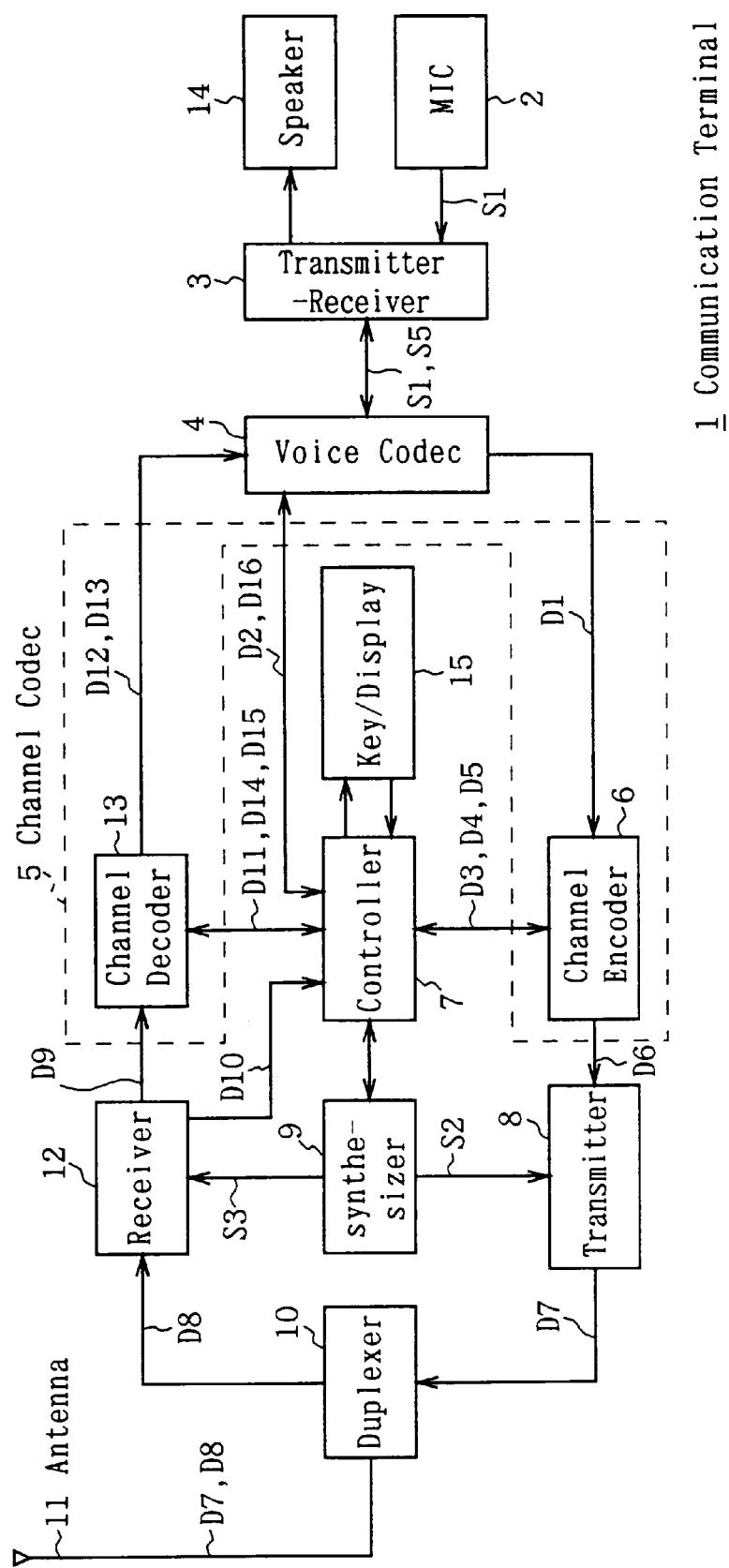
FIG. 1 is a block diagram illustrating an embodiment of the circuit configuration of a communication terminal according to the present invention.

Preferred embodiments of this invention will be described with reference to the accompanying drawings:

In FIG. 1, 1 shows, as a whole, a communication terminal to which the present invention has been applied. At the time of talking, the voice of the user which has been collected with a microphone (mic.) 2 is converted into a voice signal S1 and sent to a transmitter-receiver 3, and then the voice signal S1 is exposed to interface-translation by the transmitter-receiver 3 and sent to a voice codec 4.

The voice codec 4 is adapted to detect the circuit quality and the quality of the voice signal S1, etc., and to select a transmission processing rate which accords with the result of the detection out of two species of preset transmission processing rates of, for example, 9,600 bps and 4,800 bps to employ it. In this way, each time the transmission processing rate is selected and switched, the voice codec 4 digitizes the voice signal S1 which is formed with the selected transmission processing rate, and delivers thus obtained voice data D1 to a channel encoder 6 of a channel codec 5. In addition to this, each time the transmission processing rate is selected and switched, the voice codec 4 generates a rate information data D2 which represents the selected transmission processing rate, and sends this to a controller 7.

The controller 7 generates a transmission processing control data D3 which is corresponding to the rate information data D2, and sends this to the channel encoder 6, and hereby controls the channel encoder 6 so as to cause it to execute transmission processing which accords with the transmission processing rate.

On the basis of the control of the controller 7, the channel encoder 6 adds a communication control data D4 which is inputted from the controller 7 to the voice data D1 and performs convolutional coding, and then interleaves the coded data which is obtained. The channel encoder 6 is storing, at this time, the control information which has been inputted from the controller 7 as a control information data D5, and, by this, replaces the stated position of the data which has been obtained through interleaving with the control information which is represented by the control information data D5, and sends a replaced data D6 which has been obtained in this way to a transmitter 8.

The transmitter 8, which has received a frequency control signal S2 for controlling the transmission frequency from a synthesizer 9, modulates the replaced data D6 with the stated format on the basis of the frequency control signal S2, and transmits the resulted transmission data D7 to the base station (not shown), via a duplexer 10 and an antenna 11 in order, periodically (as an example, one period is 20 msec or so) and sequentially (hereinafter, this is referred to as burst form) with a radio transmission rate of, for example, 19,200 bps.

At the same time, a receiver 12 of the communication terminal 1 receives a transmitted data D8 which has been sent from the base station in a burst form (as is above-mentioned, one period is 20 msec or so) with a radio transmission rate of 19,200 bps (hereinafter, this is referred to as a received data), via the antenna 11 and the duplexer 10 in order. In this connection, the received data D8, which has been received by the communication terminal 1, is formed from the data which has the transmission processing rate of 9,600 bps or 4,800 bps, by performing transmission processing as is above-mentioned.

The receiver 12, which has received a frequency control signal S3 for controlling the reception frequency from the synthesizer 9, demodulates the received data D8 with the stated format, on the basis of the frequency control signal S3. Besides, the receiver 12, which has previously stored the replaced position information of the control information, sends the control information included in a demodulated data D9 to the controller 7 as a control information data D10 on the basis of the replaced position information, and sends the demodulated data D9 to a channel decoder 13. The channel decoder 13, which is controlled as a whole on the basis of a reception processing control data D11 inputted from the controller 7, executes reception processing toward the demodulated data D9, in accordance with two species of transmission rates (hereinafter, this is referred to as a reception processing rate) of 9,600 bps and 4,800 bps which are the same as the transmission processing rate, because the transmission processing rate at the transmitting side is unknown. In this case, the channel decoder 13 de-interleaves the demodulated data D9 for every reception processing rate and performs error correction decoding by the Viterbi decoding method, and then extracts the component voice data D12 and D13 from two species of decoded data which have been obtained in this way and sends them to the voice codec 4, and also extracts the communication control data D14 and D15 and sends them to the controller 7, respectively.

Then, the controller 7, which has received the stated processing result information from the channel decoder 13 for every reception processing of two species, estimates the transmission processing rate of the transmitting side on the basis of the processing result information, sends an estimated rate data D16 which represents the result of this estimation to the voice codec 4, and selects the corresponding communication control data D14 or D15 out of two communication control data D14 and D15, on the basis of the result of the estimation of the transmission processing rate. The voice codec 4 selects the corresponding voice data D12 or D13 out of two voice data D12 and D13 on the basis of the estimated rate data D16, converts the selected voice data D12 or D13 to analog data, performs interface conversion of the thus obtained voice signal S5 via the transmitter-receiver 3, and sends this to the speaker 14. In this way, the communication terminal 1 is adapted to allow the speaker 14 to generate the voice of the partner of conversation based on the voice signal S5, and to allow the user to perform voice communication with the partner.

Besides, the controller 7 generates the communication control data D4 which is added to the voice data D1, decodes the selected communication control data D14 or D15, executes setting, releasing, and maintenance of a call, and executes I/O controlling of a key/display 15. In addition to this, the controller 7 controls the synthesizer 9 for controlling the transmission frequency and the reception frequency.

Figure 2:
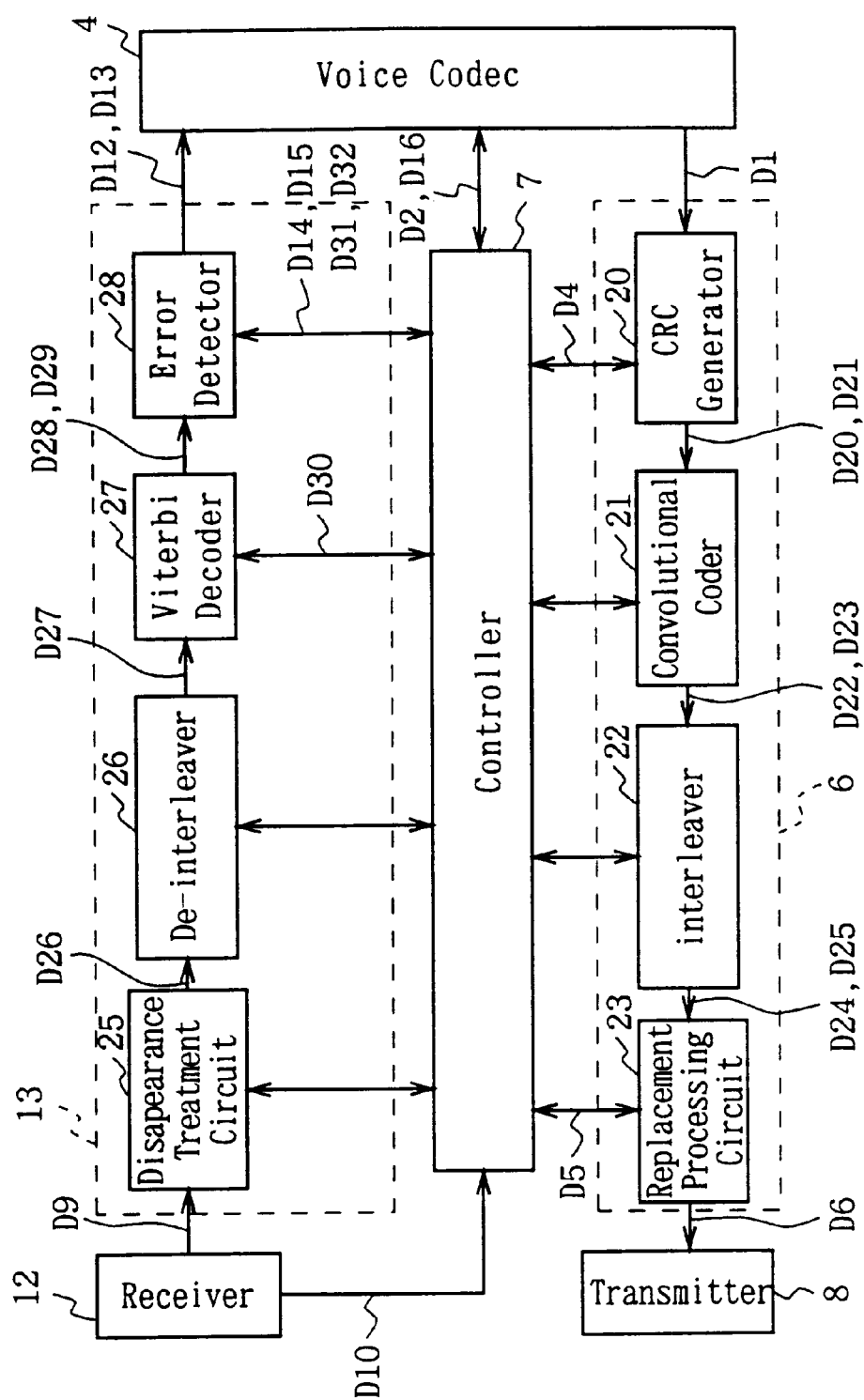
FIG. 2 is a block diagram illustrating a circuit configuration of the channel codec.
Figure 3:
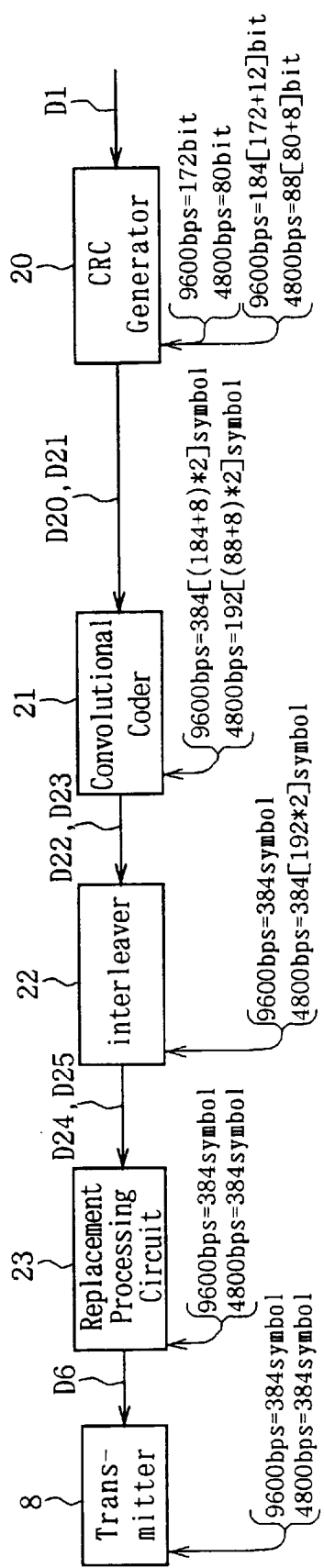
FIG. 3 is a block diagram explaining the transmission processing in the channel codec.

As shown in FIG. 2 and FIG. 3 which have the same reference numerals as those of FIG. 1 on their parts corresponding to those of FIG. 1, first, at the time of transmission, in the channel encoder 6, the voice data D1 of transmission processing rate of 9,600 bps or 4,800 bps is inputted to a CRC generator 20 from the voice codec 4.

First, in the case where the voice data D1 of the transmission processing rate of 9,600 bps has been inputted, the CRC generator 20 adds the communication control data D4 which is inputted from the controller 7 to the voice data D1 so as to generate the original data of 172 bits in total; then, employing the generating polynomial G1(x) which is represented by the following equation (1):

$$G1(X)=X^{12}+X^{11}+X^{10}+X^9+X^8+X^4+X+1 \qquad (1)$$

it generates a CRC code of 12 bits from the generated original data, and adds this to the original data to generate a data of 184 bits. After this, by adding an 8-bit tail byte which is comprised of 0s to the 184-bit data, the CRC generator 20 generates a code added data D20 of 192 bits, and sends this to a convolutional coder 21.

In the case where the voice data D1 of the transmission processing rate of 4,800 bps has been inputted, the CRC generator 20 adds the communication control data D4 which is inputted from the controller 7 to the voice data D1 so as to generate the original data of 80 bits in total; then, employing the generating polynomial G2(x) which is represented by the following equation (2):

$$G2(X)=X^8+X^7+X^4+X^3+X+1 \qquad (2)$$

it generates a CRC code of 8 bits from the generated original data, and adds this to the original data to generate a data of 88 bits. After this, by the adding 8-bit tail byte which is comprised of 0s to the 88-bit data, the CRC generator 20 generates a code added data D21 of 96 bits, and sends this to the convolutional coder 21.

The convolutional coder 21 performs convolutional coding of the code added data D20 and D21 on the basis of a constraint length k (which has been set to 9, in this case) and a coding factor R (which has been set to ½, in this case) which have been previously set, and sends coded data D22 and D23 which have been obtained in this way to an interleaver 22. In this connection, the convolutional coder 21 generates the coded data D22 of 384 symbols from the code added data D20 of 192 bits of the transmission processing rate of 9,600 bps, or generates the coded data D23 of 192 symbols from the code added data D21 of 96 bits of the transmission processing rate of 4,800 bps.

First, in the case where the coded data D22 of 384 symbols of the transmission processing rate of 9,600 bps has been inputted, the interleaver 22 interleaves the coded data D22, and then sends the obtained 384-symbol translated data D24 to a replacement processing circuit 23. While, in the case where the coded data D23 of 192 symbols of the transmission processing rate of 4,800 bps has been inputted, the interleaver 22 interleaves the coded data D23, and then, by repeating such a processing twice for every symbol of the data, it generates the 384-symbol translated data D25 and sends it to a replacement processing circuit 23. In this way, the interleaver 22 generates the translated data D24 and the translated data D25 which are comprised of the same number of symbols apparently, in spite of their transmission processing rates.

The replacement processing circuit 23, having a storage circuit in which the replace position information has been previously stored, replaces the symbols of the respective stated positions of the translated data D24 or D25 to the control information, on the basis of the replace position information, and then sends the replaced data D6 which is obtained in this way to the transmitter 8.

At here, as shown in FIG. 4, the data format in transmission processing becomes different in turn, every time the transmission processing of convolutional coding and interleaving, etc. is performed as stated above. In this connection, the replace position information has been set such that one arbitrary and different symbol is replaced for every 32 symbols, as an example.

Figure 5:
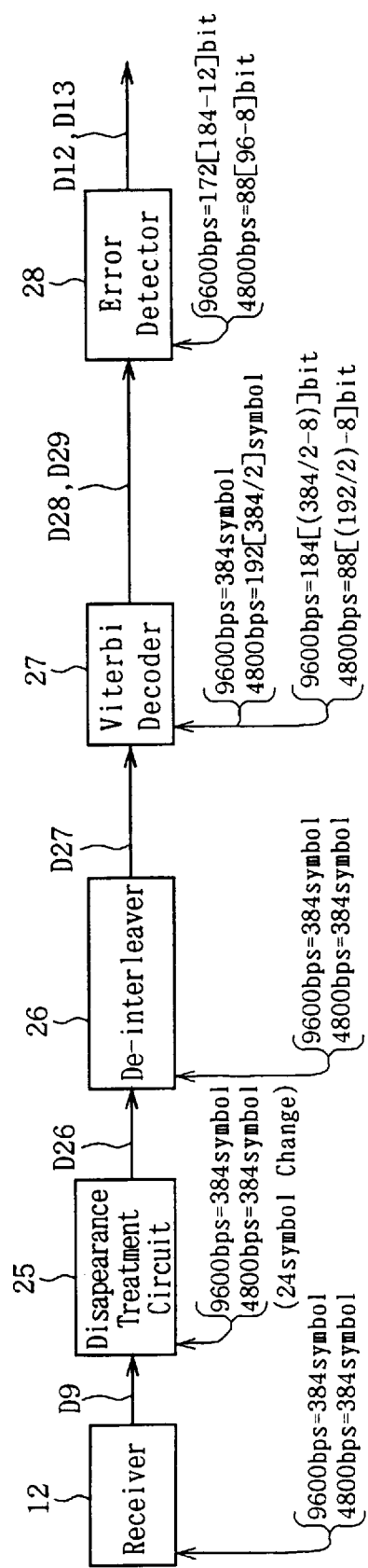
FIG. 5 is a block diagram explaining the reception processing in the channel codec.

On the other hand, as shown in FIG. 2, and FIG. 5 which has the same reference numerals as those of FIG. 1 on its parts corresponding to those of FIG. 1, at the time of reception, the demodulated data D9 of 384 symbols is being outputted sequentially from the receiver 12, and the demodulated data D9 is inputted to a disappearance treatment circuit 25 of the channel decoder 13.

The disappearance treatment circuit 25, which is storing the same replace position information as that of the above-mentioned receiver 12, detects the replace position for each 384-symbol demodulated data D9 on the basis of the replace position information, translates the control information of the detected replace position to the disappearance information, and then sends a first disappearance-information added data D26 of 384 symbols wherein the disappearance-information is located at the replace position to a de-interleaver 26.

The de-interleaver 26, which includes a storage circuit, causes the storage circuit to store once the first disappearance-information added data D26 of 384 symbols which are inputted sequentially, and then de-interleaves them, in such a manner that it reads out the respective symbols of the first disappearance-information added data D26 which have been stored in the storage circuit, in accordance with the stated order which is different from that of the time of storing of them.

In fact, in the case where the first disappearance-information added data D26 is read from the storage circuit, the de-interleaver 26 reads the first disappearance-information added data D26 of 384 symbols, employing the reception processing rate of 9,600 bps first; and, subsequently to this, it reads the first disappearance-information added data D26 of the same 384 symbols, employing the reception processing rate of 4,800 bps (that is, it reads one first disappearance-information added data D26 of 384 symbols two times from the storage circuit, with the different reception processing rates). The de-interleaver 26 de-interleaves the first disappearance-information added data D26 in this way, and then delivers the thus obtained second disappearance-information added data D27 to a Viterbi decoder 27, with two species of reception processing rates which have been employed in de-interleaving.

In the case where the second disappearance-information added data D27 has been inputted with the reception processing rate of 9,600 bps, the Viterbi decoder 27 performs Viterbi decoding of 384-symbols data of the second disappearance-information added data D27 just as it is; while, in the case where the second disappearance-information added data D27 has been inputted with the reception processing rate of 4,800 bps, it translates the second disappearance-information added data D27 (which is comprised of 384 symbols) to 192-symbol data, and then performs Viterbi decoding of this.

In fact, the Viterbi decoder 27is adapted to execute maximum likelihood decoding, wherein the constraint length k is set to "9" and the coding factor R is set to "½", employing the Viterbi algorithm; when the first disappearance-information added data D27 has been inputted with the reception processing rate of 9,600 bps, it performs Viterbi decoding of this and then eliminates the tail bits so as to generate the decoded data D28 of 184 bits, on the other hand, when the second disappearance-information added data D27 has been inputted with the reception processing rate of 4,800 bps, it converts this to 192-symbol data and performs Viterbi decoding of this, and generates the decoded data D29 of 88 bits in such a manner that the tail bits are eliminated. Thus generated decoded data D28 and D29 are respectively sent to an error detector 28.

The Viterbi decoder 27 treats a maximum likelihood path metric of the data sequence which is obtained by Viterbi decoding processing (a digitized value for representing the certainty of a data sequence which is obtained by decoding) as a path metric data D30, and sends this to the controller 7 as one of the process result information which is employed to estimate the transmission processing rate.

First, in the case where the decoded data D28 has been inputted with the reception processing rate of 9,600 bps, the error detector 28 performs error detection of the decoded data D28 employing the generating polynomial G1(x) shown in the above-mentioned equation (1), and then sends thus obtained result of the detection to the controller 7, as the error detection data D31. In addition to this, the error detector 28 eliminates a partial data which is estimated that the CRC code has been added to it from the decoded data D28, extracts the voice data D12 from the 172-bit original data which is obtained in this way and sends this to the voice codec 4, and also extracts the communication control data D14 from the original data and sends this to the controller 7.

On the other hand, in the case where the decoded data D29 has been inputted with the reception processing rate of 4,800 bps, the error detector 28 performs error detection of the decoded data D29 employing the generating polynomial G2(x) shown in the above-mentioned equation (2), and then sends thus obtained result of the detection to the controller 7, as the error detection data D32. In addition to this, the error detector 28 eliminates a partial data which is estimated that the CRC code has been added to it from the decoded data D29, extracts the voice data D13 from the 80-bit original data which is obtained in this way and sends this to the voice codec 4, and also extracts the communication control data D15 from the original data and sends this to the controller 7.

By employing the error detection data D31 and D32 as the processing result information, along with the path metric data D30 which is obtained through two species of reception processing by the Viterbi decoder 27 (Viterbi decoding), the controller 7 estimates the transmission processing rate on the basis of the path metric data D30 and the error detection data D31 and D32.

In the disappearance treatment circuit 25, the demodulated data D9 which is inputted from the receiver 12 is comprised of 16-valued soft decision data, and the control information which locates on the replace position of the demodulated data D9 is translated into the disappearance information whose soft decision symbol is comprised of 0, and the decoded data portion other than the control information is translated from 16-valued soft decision data to 14-valued soft decision data, so that the first disappearance-information added data D26 which is comprised of the 14-valued soft decision data and the disappearance information can be generated.

First, as shown in FIG. 6, each symbol of the demodulated data D9 is comprised of four bits, and the most significant bit (bit3) of this four bits represents a polarity of 0 or 1, and the low order three bits (bit2 to bit0) represent the reliability of the polarity. In this connection, in the case where the polarity is 0, the low order three bits of 111 represent the highest reliability (High), and the low order three bits of 000 represent the lowest reliability (Low). While, in the case where the polarity is 1, the low order three bits of 000 represent the highest reliability (High), and the low order three bits of 111 represent the lowest reliability (Low).

In this connection, in the demodulated data D9 like this, a metric (certainty) of each symbol whose polarity is 0 or 1 is represented using hexadecimal notation wherein 0 means the maximum likelihood metric, and, in the case where the polarity is 0 and the reliability is highest (the low order three bits are 111), the metric whose polarity is 0 (BM0) would appear as 0, and the metric whose polarity is 1 (BM1) would appear as F. On the other hand, in the case where the polarity is 1 and the reliability is highest (the low order three bits are 000), the metric whose polarity is 0 (BM0) would appear as F, and the metric whose polarity is 1 (BM1) would appear as 0.

As shown in FIG. 7, each symbol of the first disappearance-information added data D26 which is generated by the disappearance treatment circuit 25 is comprised of four bits as with the above-mentioned demodulated data D9;the most significant bit (bit3) of this four bits represents a polarity of 0 or 1, and the low order three bits (bit2 to bit0) represent the reliability of the polarity.

In this case, in the first disappearance-information added data D26, a soft decision symbol which is comprised of 0s (that is, each of them is 0) has been allocated to the disappearance information, so that, in the case where the polarity is 0, the low order three bits of 111 represent the highest reliability (High), and the low order three bits of 001 represent the lowest reliability (Low), while, in the case where the polarity is 1, the low order three bits of 001 represent the highest reliability (High), and the low order three bits of 111 represent the lowest reliability (Low), and the symbol whose polarity is 1 and whose low order three bits are 000 is not used.

As to the first disappearance-information added data D26, a metric (certainty) of each symbol whose polarity is 0 or 1 is represented using 14-valued notation wherein 0 means the maximum likelihood metric, and, in the case where the polarity is 0 and the reliability is highest (the low order 3 bits are 111), the metric whose polarity is 0 (BM0) would appear as 0, and the metric whose polarity is 1 (BM1) would appear as D, on the other hand, in the case where the polarity is 1 and the reliability is highest (the low order three bits are 001), the metric whose polarity is 0 would appear as D, and the metric whose polarity is 1 would appear as 0. However, the disappearance information is differentiated from the other data, in such a manner that both metrics whose polarities are 0 and 1 are represented as 0.

In fact, the disappearance treatment circuit 25 is able to generate the first disappearance-information added data D26 from the demodulated data D9, by executing the disappearance treatment which will be shown below.

Figure 8:
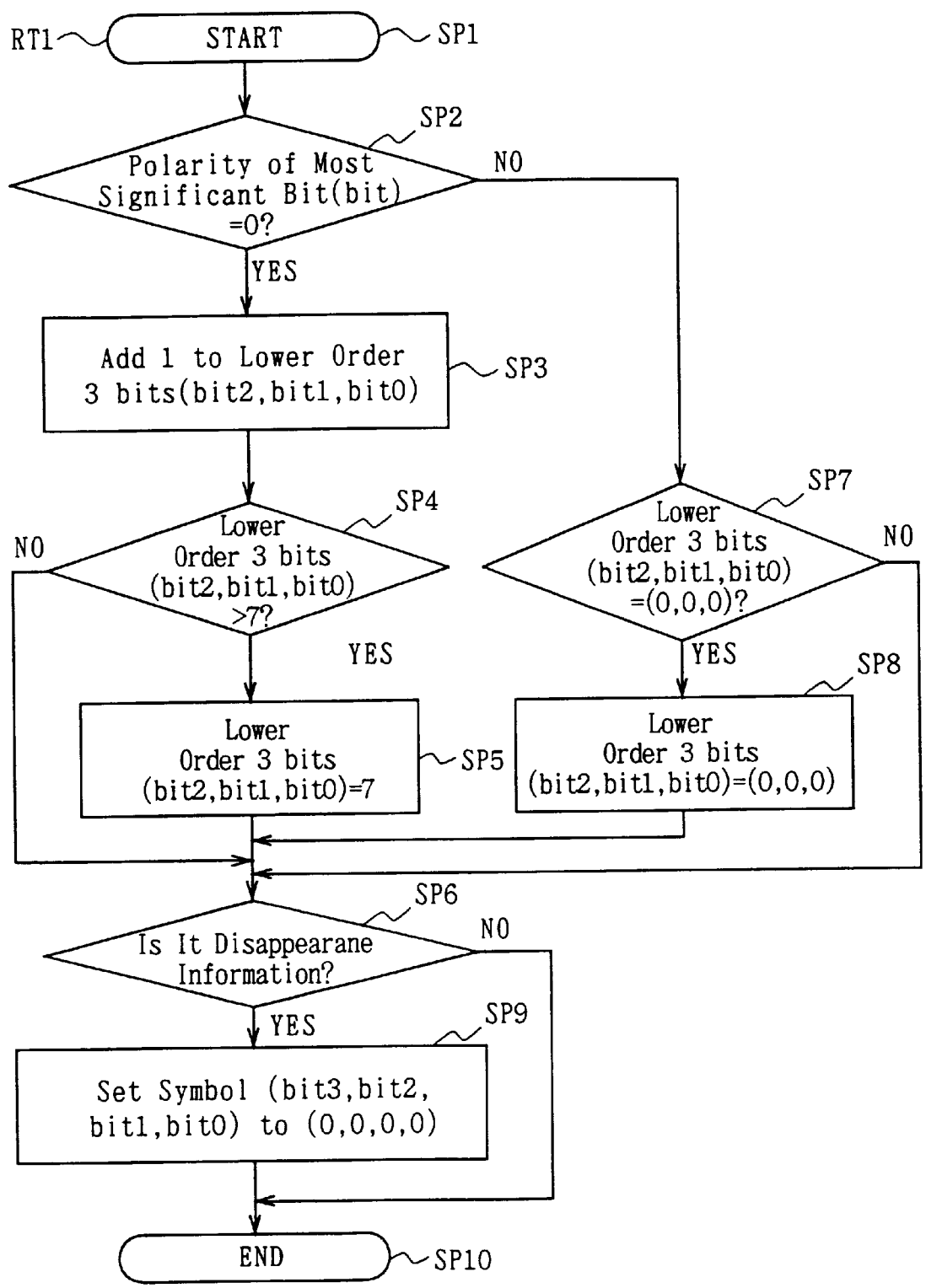
FIG. 8 is a flow chart illustrating the disappearance treatment procedure in the disappearance treatment circuit.

That is, as shown in FIG. 8, the disappearance treatment circuit 25 starts the disappearance treatment procedure RT1 at the step SP1 for every one symbol of the demodulated data D9, goes to the step SP2, and judges whether the polarity which is represented by the most significant bit (bit3) is 0 or not, at this step SP2; if the obtained result is yes (that is, the polarity is 0), it goes to the following step SP3, and adds 1 to the low order three bits.

Next, the disappearance treatment circuit 25 goes to the step SP4, and judges whether the value of the low order three bits to which 1 has been added is larger than 7 (that is, the low order three bits are 111); if the obtained result is yes, it fixes the low order three bits to 7 (111) at the following step SP5, and then goes to the step SP6. On the other hand, if the negative result has been obtained at the step SP4, the disappearance treatment circuit 25 fixes the low order three bits just as they are, and goes to the step SP6.

If the result which has been obtained at the step SP2 is no (that is, the polarity is 1), the disappearance treatment circuit 25 goes to the step SP7, so as to judge whether the value of the low order three bits is 0 (that is, the low order three bits are 000); if the obtained result is yes, it converts the value of the low order three bits to 1 (that is, the low order three bits are 001) at the following step SP8, and then goes to the step SP6. On the other hand, if the negative result has been obtained at the step SP7, the disappearance treatment circuit 25 fixes the value of the low order three bits just as it is, and goes to the step SP6.

Then, the disappearance treatment circuit 25 judges whether one symbol of which disappearance treatment is being performed at present is disappearance information or not at the step SP6, on the basis of the replace position information which has been previously stored, and, if the obtained result is yes (that is, it is disappearance information), goes to the step SP9 so as to convert the four bits of this one symbol into 0 (that is, 0000), and then goes to the following step SP10. On the other hand, if the negative result has been obtained at the step SP6 (it is other than disappearance information), the disappearance treatment circuit 25 sets the four bits which are being represented by one symbol at this time point as a new symbol, and then goes to the step SP10.

The disappearance treatment circuit 25 translates one symbol of the demodulated data D9 (which is comprised of 16-valued soft decision data) into 14-valued soft decision data or disappearance information in this way, and ends the disappearance treatment with respect to the very one symbol at the step SP10, thereby completing the disappearance treatment procedure RT1.

In this manner, every time the demodulated data D9 of 384 symbols is inputted, the disappearance treatment circuit 25 performs disappearance treatment of the respective symbols of the demodulated data D9 in order, in accordance with the above-mentioned disappearance treatment procedure RT1, thereby translating the demodulated data D9 of 384 symbols into the first disappearance-information added data D26 of 384 symbols which are comprised of 14-valued soft decision data and disappearance information.

The first disappearance-information added data D26 which has been thus obtained in the disappearance treatment circuit 25 is translated into the second disappearance-information added data D27 through the de-interleaver 26, and then inputted to the Viterbi decoder 27.

The Viterbi decoder 27 first performs the preprocessing for Viterbi decoding with respect to the second disappearance-information added data D27 which has been inputted with the reception processing rates of 9,600 bps and 4,800 bps respectively, and then performs Viterbi decoding with respect to thus obtained third disappearance-information added data of two species, which are corresponding to the reception processing rates, respectively.

In this case, as shown in FIG. 9, the third disappearance-information added data is comprised of 14-valued soft decision data and disappearance information of which data format differs from that of the above-mentioned second disappearance-information added data D27. Each symbol of the third disappearance-information added data is comprised of five bits, wherein the most significant bit (Loss) out of this five bits represents whether it is disappearance information or not (0represents the other than disappearance information, and 1 represents disappearance information), and the lower order one bit (bit3) represents the polarity of 0 or 1, and the further low order three bits (bit2 to bit0) represent the reliability of the polarity. However, as to disappearance information, the low order four bits are adapted to take the various values.

In this third disappearance-information added data, in the case of the respective symbols other than disappearance information and the polarity of 0, the low order three bits of 110 represent the highest reliability (High) and the low order three bits of 000 represent the lowest reliability (Low), on the other hand, in the case where the polarity is 1, the low order three bits of 001 represent the highest reliability (High) and the low order three bits of 111 represent the lowest reliability (Low). In this connection, in the third disappearance-information added data, the symbol whose polarity is 0 and whose low order three bits are 111 is not employed, along with the symbol whose polarity is 1 and whose low order three bits are 000.

Therefore, in the third disappearance-information added data, if a metric of each symbol whose polarity is 0 or 1 is represented using 14-valued notation wherein 0 means the maximum likelihood metric, then, in the case where the polarity is 0 and the reliability is highest (the low order three bits are 110), the metric whose polarity is 0 (BM0) can be represented by 0, and the metric whose polarity is 1 (BM1) can be represented by D, on the other hand, in the case where the polarity is 1 and the reliability is highest (the low order three bits are 001), the metric whose polarity is 0 can be represented by D, and the metric whose polarity is 1 can be represented by 0. However, the disappearance information is differentiated from the other data, in such a manner that both metrics whose polarities are respectively 0 and 1 are represented by 0s.

At this point, in the Viterbi decoder 27, the second disappearance-information added data D27 is inputted to a branch metric arithmetic circuit which has been provided in the Viterbi decoder 27, and a preprocessing which will be shown below is executed in the branch metric arithmetic circuit, so that the third disappearance-information added data can be generated from the second disappearance-information added data D27.

Figure 10:
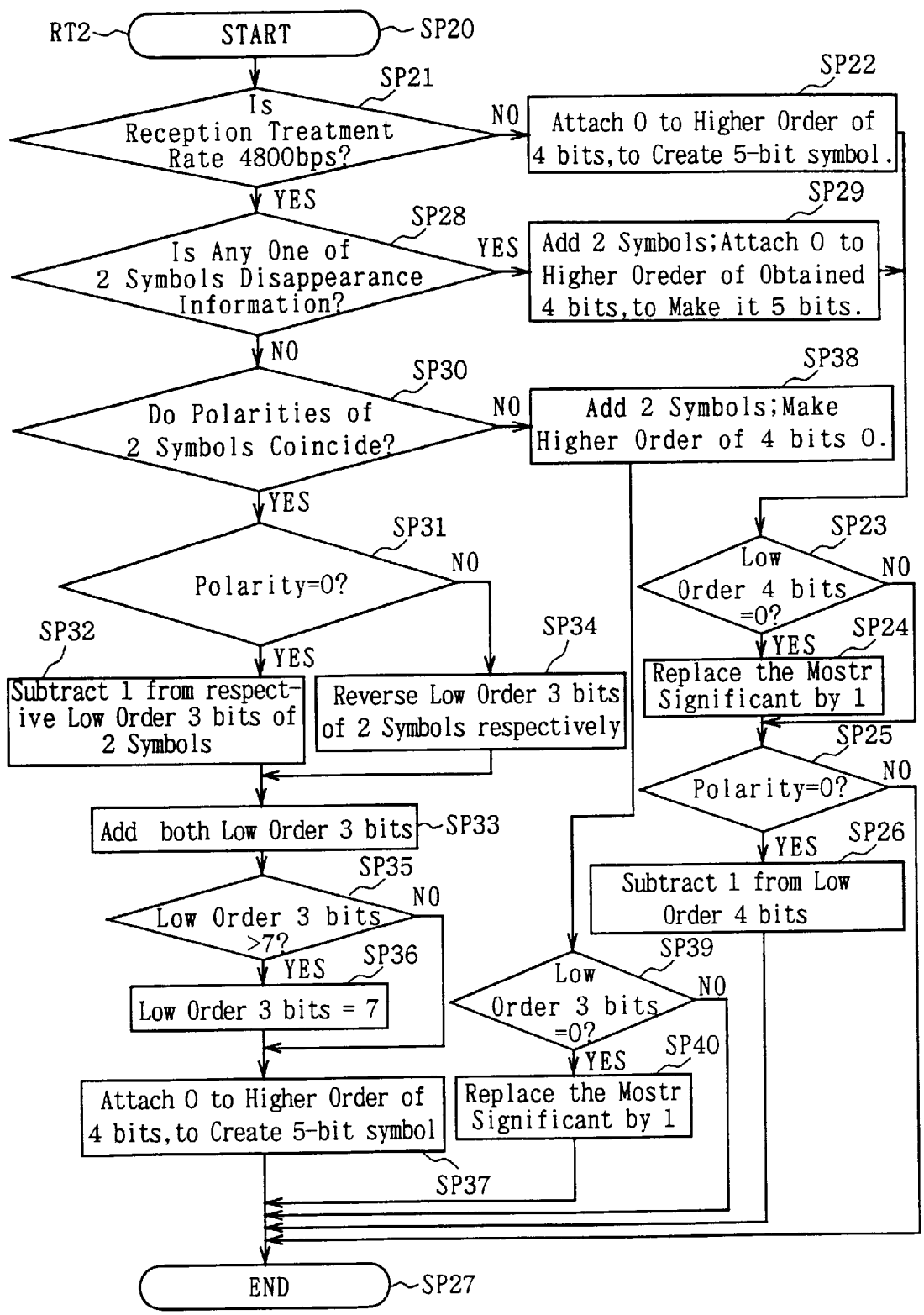
FIG. 10 is a flow chart illustrating the preprocessing procedure of the second disappearance-information added data in the branch metric arithmetic circuit of the Viterbi decoder.

In this case, the branch metric arithmetic circuit includes a preprocessing division and a control division for controlling the preprocessing division, and, when the second disappearance-information added data D27 has been inputted with a reception processing rate of 9,600 bps, the second disappearance-information added data D27 is caused to enter the preprocessing division in order. By this, as shown in FIG. 10, the control division starts the preprocessing procedure RT2 at the step SP20, and goes to the step SP21, so as to judge whether the very one symbol which has been inputted at the step SP21 has been inputted with the reception processing rate of 4,800 bps or not. Obtaining the negative result, the control division goes to the following step SP22, fixes the value of the four bits of the symbol, and attaches (loss) 0, which represents the symbols other than the disappearance information, to the position of still higher order than the most significant bit of the very four bits, so as to translate the very 4-bit symbol into a new 5-bit symbol.

Next, the control division goes to the step SP23, judges whether the value of the low order four bits (bit3 to bit0) of the new symbol which has been obtained at the preceding step is 0 (that is, the low order four bits are 0000) or not, and, if the affirmative result has been obtained, then determines that it is disappearance information, and reverses the most significant bit (loss) from 0 to 1 at the following step SP24, and then goes to the step SP25. At this point, if the negative result has been obtained at the step SP23, the control division goes to the step SP25.

The control division judges whether the polarity of the new symbol is 0 or not, at the step SP25; if the affirmative result has been obtained, it goes to the following step SP26 and subtracts 1 from the low order four bits (bit3 to bit0), and then goes to the step SP27. At this point, if the negative result has been obtained at the step SP25, then the control division goes to the step SP27. The control division thus translates one symbol of the second disappearance-information added data D27 which has been inputted with the reception processing rate of 9,600 bps into 14-valued soft decision data or disappearance information of the above-mentioned format which is shown in FIG. 9, and ends the preprocessing with respect to the very one symbol at the step SP27, thereby completing the preprocessing procedure RT2.

With respect to the respective symbols of the second disappearance-information added data D27 which have been inputted with the reception processing rate of 9,600 bps, the control division sequentially executes the preprocessing of the above-mentioned steps SP20 to SP27, in this way it generates the third disappearance-information added data of 384 symbols from the second disappearance-information added data D27 of 384 symbols.

In the branch metric arithmetic circuit, when the second disappearance-information added data D27 is inputted with a reception processing rate of 4,800 bps, the very second disappearance-information added data D27 is caused to enter the preprocessing division sequentially two symbols at a time. By this, as shown in FIG. 10, the control division again commences the preprocessing procedure RT2 at the step SP20, and goes to the step SP21, so as to judge whether two symbols which have been inputted at the step SP21 have been inputted with the reception processing rate of 4,800 bps or not.

Obtaining the affirmative result, the control division goes to the step SP28, and judges whether any one of the two symbols is disappearance information (bit3 to bit0 are comprised of 0000). At this point, if the affirmative result has been obtained (that is, disappearance information) at the step SP28, the control division goes to the step SP29, performs addition of the two symbols (each of them is four bits), and attaches (loss) 0, which represents the symbols other than the disappearance information, to the position of still higher order than the most significant bit of the obtained four bits, so as to generate one 5-bit symbol newly from two 4-bit symbols. After this, the control division executes the above-mentioned processing of the steps SP23 to SP27.

If the negative result has been obtained at the step SP28, the control division goes to the step SP30, judges whether the polarities of the two symbols coincide or not, and, if the affirmative result has been obtained (that is, the polarities are coincident), it goes to the following step SP31, so as to judge whether the polarity is 0. At this point, if the affirmative result has been obtained (the polarity is 0) at the step SP31, the control division subtracts 1 from the respective low order three bits (bit2 to bit0) of the two symbols at the following step SP32, and then goes to the step SP33. On the other hand, if the negative result has been obtained at the step SP31, then the control division goes to the step SP34, reverses the low order three bits (bit2 to bit) of the two symbols respectively, and then goes to the step SP33.

Next, at the step SP33, the control division performs addition of the both low order three bits of the two symbols which have been obtained through the processing of the step SP32 or the step SP34 of the preceding stage, in this way it generates one new symbol whose polarity is 0 and whose low order three bits have been obtained by performing of addition. Then, the control division goes to the step SP35, judges whether the value of the low order three bits of the new symbol is a larger value than 7 (that is, 1111) or not; if the affirmative result has been obtained, then it fixes the very low order 3 bits to 7 (1111) at the following step SP36, and goes to the step SP37. On the other hand, if the negative result has been obtained at the step SP35, the control division fixes the value of the low order three bits of the new symbol just as it is, and goes to the step SP37.

Subsequently, the control division attaches (loss) 0, which represents a symbol other than disappearance information, to the position of still higher order than the most significant bit of the new symbol at the step SP37, and creates, from the new 4-bit symbol, one 5-bit symbol newly, and then goes to the step SP27.

If the negative result has been obtained at the step SP30, the control division goes to the step SP38 to perform addition of the two symbols (each of them is four bits); in the case where the resulted one symbol is comprised of four bits, it attaches (loss) 0, which represents a symbol other than disappearance information, to the position of still higher order than the most significant bit of the symbol, so as to generate a symbol which is comprised of five bits; on the other hand, in the case where the resulted one symbol is comprised of five bits, it sets the most significant bit of the very 5-bit symbol to (loss) 0, which represents a symbol other than disappearance information.

Subsequently, the control division goes to the step SP39, and judges whether the value of the low order three bits (bit2 to bit0) of the new symbol which has been obtained at the preceding stage is 0 (that is, the low order three bits are 000) or not; if the affirmative result has been obtained, it determines it as disappearance information, and reverses the most significant bit (loss) from 0 to 1 at the following step SP40, and then goes to the step SP27. On the other hand, if the negative result has been obtained at the step SP39, then the control division goes to the step SP27.

In this manner, the control division creates one symbol which is based on the above-mentioned format shown in FIG. 9 from two symbols of the second disappearance-information added data D27 which has been inputted with the reception processing rate of 4,800 bps, ends the preprocessing regarding the two symbols at the step SP27, and completes the preprocessing procedure RT2 in this way.

In this connection, the control division sequentially executes the above-mentioned preprocessing for every two symbols of the second disappearance-information added data D27 which has been inputted with the reception processing rate of 4,800 bps, in this way it creates the third disappearance-information added data of 192 symbols from the second disappearance-information added data D27 of 384 symbols.

Figure 11:
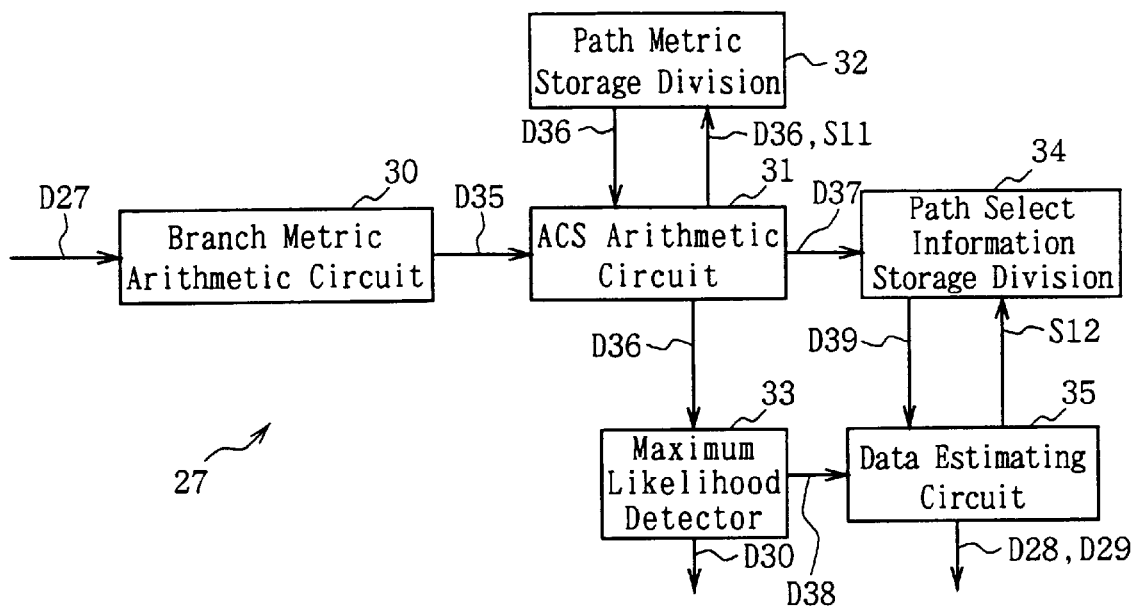
FIG. 11 is a block diagram illustrating a circuit configuration of the Viterbi decoder.

In fact, as shown in FIG. 11, in the Viterbi decoder 27, at first, the second disappearance-information added data D27 which have been outputted from the de-interleaver 26 with two species of reception processing rates are respectively inputted to the branch metric arithmetic circuit 30.

The branch metric arithmetic circuit 30 first creates the third disappearance-information added data from the second disappearance-information added data D27, in accordance with the above-mentioned preprocessing procedure RT2 (FIG. 10). After this, the branch metric arithmetic circuit 30 obtains the metric whose polarity is 0 and the metric whose polarity is 1 of each symbol of the third disappearance-information added data, and also calculates such metrics (namely, branch metrics) BM(0,0), BM(0,1), BM(1,0), and BM(1,1) that the sequential two symbols of the third disappearance-information added data are the four species of code patterns of (0,0), (0,1), (1,0), and (1,1), on the basis of the metric calculating equation which is represented by the following equation (3):

$$BM(0,0) = BM0(A) + BM0(B)$$
$$BM(0,1) = BM0(A) + BM1(B)$$
$$BM(1,0) = BM1(A) + BM0(B)$$
$$BM(1,1) = BM1(A) + BM1(B) \tag{3}$$

In this connection, the metric which is 0 and which has been obtained from the leading one symbol out of the two symbols which has been used for calculation of the branch metric is represented by BM0(A), and the metric which is 1 is represented by BM1(A), while the metric which is 0 and which has been obtained from the succeeding symbol is represented by BM0(B), and the metric which is 1 is represented by BM1(B). As to the symbol which represents disappearance information, both of the metrics whose polarities are 0 and 1 become 0, as shown in the above-mentioned FIG. 9. In this manner, the branch metric arithmetic circuit 30 delivers the branch metrics, four species of which can be obtained from the sequential two symbols of the third disappearance-information added data, to an Add Compare Select (ACS) arithmetic circuit 31 as the branch data D35.

The ACS arithmetic circuit 31 is adapted to select the maximum likelihood path out of two paths which respectively transfer, for each time, to the plural states (hereinafter, this is referred to as states) from the preceding time, on the basis of trellis diagram. In this case, with respect to such a trellis diagram that the constraint length k has been set to 9, the independent 256 states exist which are represented by the following equation (4):

$$\text{Number of States} = 2^{(K-1)} \tag{4}$$
$$= 2^{(9-1)}$$
$$= 256$$

for each time.

Accordingly, each time the branch data D35 has been inputted from the branch metric arithmetic circuit 30, the ACS arithmetic circuit 31 selects the maximum likelihood path (selection of the survival path) out of the two paths for respectively moving to the 256 states of the present time from the preceding time, employing four species of branch metrics BM(0,0), BM(0,1), BM(1,0), and BM(1,1) which are represented by the branch data D35, and calculates the path metric of the selected path; the thus obtained path metric is then sent to the path metric storage division 32 as the path data D36, and stored in it.

In addition to this, the ACS arithmetic circuit 31 delivers the path data D36 to the maximum likelihood detector 33 too, and also delivers the path selection information data D37 which represents the selected path (that is, the state of the selected path before it moves) to the path select information storage division 34, and causes the division 34 to store it.

In practice, using two hexadecimal digits (00 to FF), a new state of the present time (new) and a state of the preceding time (old) of 256 states are represented as 00(new) to FF(new), and as 00(old) to FF(old) respectively, and also a new path metric and a path metric of the preceding time in the very 256 states are represented as S00(new) to SFF(new), and as S00(old) to SFF(old) respectively; when the selection of the path in a new 00(new) state as an example is considered, toward the 00(new) state, a path which has created the (0,0) code pattern is transferred from the 00(old) state of the preceding time, and a path which has created the (1,1) code pattern is transferred from the 80(old) state.

In this case, in the ACS arithmetic circuit 31, when the branch data D35 has been inputted from the branch metric arithmetic circuit 30, the path metric of the preceding time is read from the path metric storage division 32 as the path data D36 on the basis of the read-out signal S11, and the maximum likelihood path metric in the state of the above-mentioned new 00(new) state is obtained, on the basis of the calculating equation which is represented by the following equation (5):

S00(new) a=S00(old)+BM(0,0)

S00(new) b=S80(old)+BM(1,1)

if (S00(new) a<S00(new) b)

S00(new)=S00(new) a else

S00(new)=S00(new) b  (5)

In this case, as to the path metric, the maximum likelihood state is represented by 0, and, as the value becomes larger than 0, the metric is lowered. In this way, each time the branch data D35 is inputted, the ACS arithmetic circuit 31 calculates the respective maximum likelihood path metrics of the 256 states.

Each time the path data D36 which correspond to 256 states have been inputted from the ACS arithmetic circuit 31, the maximum likelihood detector 33 selects a single maximum likelihood path metric (that is, the path metric of the least value) out of the path metrics corresponding to the 256 states which are represented by the path data D36, and also sends the selected path metric to the data estimating circuit 35 as the maximum likelihood path data D38, along with the number of the corresponding state. Besides, when the path data D36 which is in accord with the last 256 states corresponding to the third disappearance-information added data have been obtained, the maximum likelihood detector 33 sends the maximum likelihood path data D38 to the data estimating circuit 35, and also sends the path metric data D30 which represents the selected maximum likelihood path metric to the controller 7.

Each time the maximum likelihood path data D38 has been inputted, the data estimating circuit 35 creates the read-out signal S12 on the basis of the number of the state which is represented by the data D38, sends this to the path select information storage division 34, and then reads all states of which survival paths have been transferred till the preceding state of the very state, as the path selection data D39. By this, the data estimating circuit 35 estimates the decoded data D28 and D29 (executes maximum likelihood decoding) on the basis of the sequentially inputted maximum likelihood path data D38 and the respectively corresponding path selection data D39, and then sends the obtained decoded data D28 and D29 to the error detector 28.

In this way, in the Viterbi decoder 27, each time the second disappearance-information added data D27 has been inputted with the reception processing rates of 9,600bps and 4,800 bps respectively, the third disappearance-information added data of which number of symbols is different in accordance with the reception processing rate respectively is generated, and the decoded data D28 and D29 are created on the basis of the generated second disappearance-information added data.

In the above configuration, in the communication terminal 1, when the reception data D8, which has been transmitted from the transmitting side in such a manner that the symbol of the stated position is replaced into control information, has been received, the received data D8 is decoded by the receiver 12, and thus obtained decoded data D9 which is comprised of 16-valued soft decision data is subjected to disappearance treatment by the disappearance treatment circuit 25.

In this case, the demodulated data D9 which has been inputted to the disappearance treatment circuit 25 is subjected to disappearance treatment, in accordance with the disappearance treatment procedure RT1 shown in the above-mentioned FIG. 8, and translated into the first disappearance-information added data D26, by virtue of allocating each symbol other than control information to the soft decision symbol other than 0 so as to translate it into the 14-valued soft decision data, and also translating the symbol of the control information into the soft decision symbol which is comprised of 0 and then allocating it to the disappearance information.

The first disappearance-information added data D26 which has been obtained in the disappearance treatment circuit 25 is de-interleaved through the de-interleaver 26 and hereby translated into the second disappearance-information added data D27, and then inputted to the Viterbi decoder 27 and subjected to Viterbi decoding.

Therefore, in this communication terminal 1, disappearance treatment can be performed without a translation table and/or an arithmetic circuit, which have been provided in the conventional communication terminal, for translating the replaced position, because the disappearance treatment circuit 25 has been provided on the preceding stage of the de-interleaver 26, and the disappearance treatment circuit 25 is adapted to translate the symbol of the control information which is included in the demodulated data D9 into the soft decision symbol which is comprised of 0, and allocate it to the disappearance information. Hence, in the communication terminal 1, the scale of the disappearance treatment circuit can be diminished in comparison with the conventional communication terminal, and the dissipation power can be lowered hereby.

Besides, in this communication terminal 1, the disappearance treatment circuit 25 translates the symbol of the control information of the demodulated data D9 into the soft decision symbol which is comprised of 0, therefore, it is not needed to store the disappearance information in the storage circuit of the de-interleaver 26 like the conventional communication terminal, at the time of de-interleaving; accordingly, even the case of receiving the reception data D8 wherein each symbol of which includes relatively large number of bits, the disappearance treatment can be performed without relatively large capacity of storage circuit.

Moreover, because the communication terminal 1 is adapted to allocate the soft decision symbol which is comprised of 0 to the disappearance information, in the case where addition of two symbols which are both comprised of four bits is performed, during the preprocessing (above-mentioned preprocessing procedure RT2 shown in FIG. 10) which is performed, by the branch metric arithmetic circuit 30, with respect to the second disappearance-information added data D27 which has been inputted with the reception processing rate of 4,800 bps, if any one is the disappearance information, the addition without carry can be executed, and so the addition treatment can be eased.

According to the above configuration, the reception data D8 is coded, interleaved, and then the symbol of the stated position of which is replaced by the control information; then, the data D8 is transmitted from the transmitting side and received by the receiver 12 via the antenna 11 and the duplexer 10 in order; each symbol other than the control information of the demodulated data D9 which has been obtained by the receiver 12 is translated into soft decision symbol which is based upon the 14-valued soft decision data in the disappearance treatment circuit 25, and the symbol of the control information is translated into the soft decision symbol which is comprised of 0 and allocated to the disappearance information, so as to create the first disappearance-information added data D26; the created first disappearance-information added data D26 is de-interleaved through the de-interleaver 26 and then subjected to Viterbi decoding in the Viterbi decoder 27; it is hereby able to locate the disappearance information on the replaced position in the same way as the case of the conventional communication terminal, without the translation table for the replaced position and/or the arithmetic circuit for translating the replaced position, which have been needed in the conventional communication terminal; in this way, it is able to realize a communication terminal which is capable of performing Viterbi decoding with respect to the first disappearance-information added data D26 which has been obtained by performing disappearance treatment of the received data D8 with a simple circuit configuration, in the same way as the case of the conventional communication terminal.

In the above aspect of the implementation, the description has been given of the case where the 16-valued soft decision data is applied as the demodulated data D9 in the reception processing, and the 14-valued soft decision data is applied to the other than the disappearance information of the first to the third disappearance-information added data D26 and D27; however, this invention is not limited to this case, and the other various multi-valued soft decision data can be applied.

Besides, in the above aspect of the implementation, the description has been given of the case where the disappearance information is translated into the soft decision symbol which is comprised of 0, with respect to the first and the second disappearance-information added data D26 and D27; however, this invention is not limited to this case, and the disappearance information can be translated into the other soft decision symbols which are comprised of the various values.

Besides, in the above aspect of the implementation, the description has been given of the case where the control information is applied as the replacement information; however, this invention is not limited to this case, and the other various information can be applied as the replacement information.

Besides, in the above aspect of the implementation, the description has been given of the case where the disappearance treatment (above-mentioned disappearance treatment procedure RT1 shown in FIG. 8) is executed in the disappearance treatment circuit 25, and the preprocessing (above-mentioned preprocessing procedure RT2 shown in FIG. 10) is executed in the branch metric arithmetic circuit 30 of the Viterbi decoder 27; however, this invention is not limited to this case, and the disappearance treatment and the preprocessing can be executed in a combined manner, in the disappearance treatment circuit 25 or the de-interleaver 26.

Besides, in the above aspect of the implementation, the description has been given of the case where the receiving apparatus and the receiving method of the present invention is applied to the communication terminal 1 for receiving the reception data D8 which is formed by replacement of the symbol of the stated position into the control information; however, this invention is not limited to this case, and it can be applied to the other various receiving apparatus and its receiving method, such as a receiving apparatus for receiving the reception data whose symbols have been regularly thinned out by applying of punctured Viterbi decoding, or a receiving apparatus which is adapted to detect the position of disappeared symbol even if disappearance of the symbol has occurred in the data obtained through de-modulation in the receiver, owing to fault of data receiving.

Besides, in the above aspect of the implementation, the description has been given of the case where the present invention is applied to the communication terminal 1 which receives the reception data DB with a single system; however, this invention is not limited to this case, and it can be applied to a receiving apparatus which receives the identical reception data with plural systems. In this case, it is able to further improve the reduction factor of the circuit scale compared to the communication terminal of the present invention.

Besides, in the above aspect of the implementation, the description has been given of the case where the preprocessing toward the second disappearance-information added data D27 is executed in the branch metric arithmetic circuit 30, and, on the basis of the resulted third disappearance-information added data, the branch metric is calculated; however, this invention is not limited to this case, and the branch metric can be calculated in the branch metric arithmetic circuit 30 on the basis of the second disappearance-information added data D27.

In the above embodiment, the description has been given of the case where the antenna 11, the duplexer 10, and the receiver 12 are applied as the receiving means for receiving the transmitted data and for issuing the obtained reception data D8; however, this invention is not limited to this case, and the other receiving means which have various configurations can be applied, if they are able to receive the transmitted data and to send the obtained reception data to the succeeding stage.

As stated above, according to the present invention, by providing the receiving means for receiving the transmitted data and for issuing the obtained reception data, the disappearance treating means for translating the information of the received data into the stated soft decision symbol, for translating the replacement information into the specific soft decision symbol which has been set such that it represents that the information has disappeared owing to the replacement, and for generating the first disappeared-information added data, the de-interleaving means for de-interleaving the first disappeared-information added data, and for issuing the obtained second disappeared-information added data, and the decoding means for decoding the second disappeared-information added data, it is able to locate the disappearance information on the replaced position as in the past, using a circuit which is composed without a translation table of the replaced position and/or an arithmetic circuit for translating the replaced position which are needed formerly, in this way, it is able to realize a receiving apparatus which can perform disappearance treatment of the data whose information of the stated position have been replaced by the replacement information with a simple circuit configuration, and can decode the resulted first disappearance-information added data in the same way as before.

Besides, by receiving the transmitted data, translating the information of the received data into the stated soft decision symbol, translating the replacement information into the specific soft decision symbol which has been set such that it represents that the information has disappeared owing to the replacement so as to create the first disappeared-information added data, de-interleaving the first disappeared-information added data to create the second disappeared-information added data, and then decoding this, it is able to locate the disappearance information on the replaced position as in the past, without a translation table of the replaced position and/or an arithmetic circuit for translating the replaced position which are needed formerly; in this way, it is able to realize a receiving method which can perform disappearance treatment of the data whose information of the stated position have been replaced by the replacement information with a simple circuit configuration, and can decode the resulted first disappearance-information added data in the same way as before.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data receiving apparatus for receiving transmission data from a transmitter, said transmission data being produced at said transmitter by successively generating coded data including a predetermined number of symbols from digital data, by interleaving said coded data, and by respectively replacing a plurality of predetermined symbols in said coded data which has been interleaved by a plurality of symbols representing specific information to generate data, said apparatus comprising:

receiving means for receiving said transmission data and generating a first soft decision data from said received transmission data;

data translating means for replacing a plurality of symbols representing specific information of said first soft decision data by a specific symbol, and for generating second soft decision data when a data value used to represent information of each of said plurality of symbols is less than a data value of said first soft decision data;

de-interleaving means for de-interleaving said second soft decision data generated by said data translating means and generating third soft decision data; and Viterbi decoding means for decoding said third soft decision data generated by said de-interleaving means.

2. The data receiving apparatus according to claim 1, wherein said specific symbol is a value selected from among values used to respectively represent said plurality of symbols of said first soft decision data.

3. The data receiving apparatus according to claim 2, wherein each of said plurality of symbols of said first soft decision data includes a polarity value of "0" or "1" and a reliability value representing a reliability of said polarity value, said specific symbol is selected from symbols having one of said polarity values, and one of said plurality of symbols having the other of said polarity values is not used.

4. The data receiving apparatus according to claim 3, wherein said symbol selected from said first soft decision data as said specific symbol has a same reliability value as said symbol which is not used among said first soft decision data.

5. A data receiving method for receiving transmission data from a transmitter said transmission data being produced at said transmitter by successively generating coded data including a predetermined number of symbols from digital data, for interleaving said coded data, for respectively replacing a plurality of predetermined symbols in said coded data which has been interleaved by a plurality of symbols representing specific information to generate data, said method comprising the steps of:

receiving said transmission data and generating first soft decision data from said received transmission data;

replacing said plurality of symbols representing said specific information of said first soft decision data by a specific symbol and generating second soft decision data when a data value used to represent information of each of said plurality of symbols is less than a data value of said first soft decision data;

de-interleaving said second soft decision data and generating third soft decision data; and Viterbi decoding said third soft decision data.

6. The data receiving method according to claim 5, wherein said specific symbol is a value selected from among values used to respectively represent each of said plurality of symbols of said first soft decision data.

7. The data receiving method according to claim 6, wherein each of said plurality of symbols of said first soft decision data includes a polarity value of "0" or "1" and a reliability value representing a reliability of said polarity value, said specific symbol is selected from symbols having one of said polarity values, and one of said symbols having the other of said polarity values is not used.

8. The data receiving method according to claim 7, wherein the symbol selected from said first soft decision data as said specific symbol has a same reliability value as said symbol which is not used among said first soft decision data.

* * * * *